US005181018A

United States Patent [19]

Cowie et al.

[11] Patent Number: 5,181,018

[45] Date of Patent: Jan. 19, 1993

[54] ACCESS CONTROL BOOTH WITH ARCUATE DOORS

[75] Inventors: Theo D. Cowie; John M. Malan; Malcolm W. Thomas, all of Johannesburg, South Africa

[73] Assignee: Threshold Control Systems CC, Johannesburg, South Africa

[21] Appl. No.: 674,571

[22] Filed: Mar. 25, 1991

[51] Int. Cl.[5] .................... H04Q 1/00

[52] U.S. Cl. .................... 340/825.31; 49/41

[58] Field of Search .................... 340/825.31, 825.3; 49/40, 41, 42, 68, 93, 94, 116, 117, 118, 120; 187/52 R; 109/2, 9; 312/286, 287

[56] References Cited

U.S. PATENT DOCUMENTS

| | | | |
|---|---|---|---|
| 2,728,625 | 12/1955 | Blahnik | 49/41 |
| 3,564,132 | 2/1971 | Baker | 340/825.31 |
| 4,121,523 | 10/1978 | Hastings | 109/2 |
| 4,244,302 | 1/1981 | Stine | 49/41 |
| 4,481,887 | 11/1984 | Urbano | 49/68 |
| 4,928,429 | 5/1990 | Columbo | 49/41 |

*Primary Examiner*—Donald J. Yusko
*Assistant Examiner*—Edwin C. Holloway, III
*Attorney, Agent, or Firm*—Kenyon & Kenyon

[57] ABSTRACT

An access control booth 10 includes a housing 12 having a base member 26, a roof member 28 and a side wall portion 30 extending between the base member 26 and the roof member 28, the side wall portion 30 having a circular inner plan profile to define a pair of opposed arcuate access openings 14, 16. A pair of counter-pivoted arcuate members 20, 24 close the access openings 14, 16, respectively. Each arcuate member 20, 24 has a first arm pivotally mounted within the roof member 28, a second arm pivotally mounted beneath the base member 26 and an arcuate wall portion extending between the first arm and the second arm. A torsion-bar assembly is connected to the first arm and the second arm of each arcuate member 20, 24 for inhibiting twisting of the arcuate member 20, 24 as it pivots, the torsion-bar assembly being arranged inwardly of the arcuate wall portion of the arcuate member 20, 24.

16 Claims, 3 Drawing Sheets

ACCESS CONTROL BOOTH WITH ARCUATE DOORS

FIELD OF THE INVENTION

THIS INVENTION relates to access control. More particularly, the invention relates to an access control booth.

SUMMARY OF THE INVENTION

According to the invention, there is provided an access control booth which includes a housing which defines a pair of opposed access openings; and a closure means for openably closing each access opening, each closure means being pivotally mounted within the housing via a pivot point arranged substantially centrally within the housing.

The housing may have a base member, a roof member and a side-wall portion extending between the base member and the roof member, the side-wall portion having a substantially circular inner plan profile to define substantially arcuate access openings.

Each closure means may comprise at least one arcuate member which is pivotally mounted in the housing. Preferably, each closure means comprises a pair of counter-pivoted arcuate members for opening or closing their associated access openings. By "counter-pivoted" is meant that the arcuate members move in opposite directions about their pivot points.

Each arcuate member may comprise a first arm pivotally mounted within the roof member, a second arm pivotally mounted beneath the base member and an arcuate wall portion extending between the first arm and the second arm.

Each arcuate member may include a torsion-inhibiting means connected between the first arm and the second arm for inhibiting twisting of the arcuate member as it pivots.

Those arcuate members arranged on the same side of an imaginary vertical median plane bisecting the access openings may pivot about a common pivotal axis.

The said arcuate members on the same side of the imaginary plane may be shaped such that, when both members are in their open position, one member nests within the other member thereby to reduce an overall depth of the housing.

The booth may include a drive means for driving the closure means. The drive means may comprise a drive arrangement for driving the closure means independently of each other, the drive arrangements being mounted within the roof member of the housing.

Each drive arrangement may include a synchronizing means for synchronizing pivotal movement of their associated arcuate members. Each synchronizing means may include a pair of counter-rotating pulley-like elements interconnected by a belt arrangement of a non-stretch material, each pulley-like element being connected to its associated arcuate member by a linkage assembly.

Each linkage assembly may include an overcentre locking means for positively locking its arcuate member in it closed position.

The booth may further include a control means for controlling operation of the drive means. The control means may include a controller, such as a programmable logic controller, for controlling the operation of the drive means.

The control means may include a detecting means for detecting the presence of a person in proximity to the housing, the detecting means being connected to the controller.

The detecting means may include a first detector for detecting the approach of a person to the housing and at least one further detector for detecting the presence of a person in either access opening or within the housing.

The controller may further include an access verification means arranged at each access opening, the controller being operable to close or open the closure means on receipt of appropriate signals from the access verification means and the detecting means.

The wall portion of each arcuate member may be of a transparent material for rendering a person within the booth visible to a person outside the booth.

BRIEF DESCRIPTION OF THE DRAWINGS

The invention is now described by way of example with reference to the accompanying diagrammatic drawings.

In the drawings.

DETAILED DESCRIPTION OF THE DRAWINGS

Figure 2:
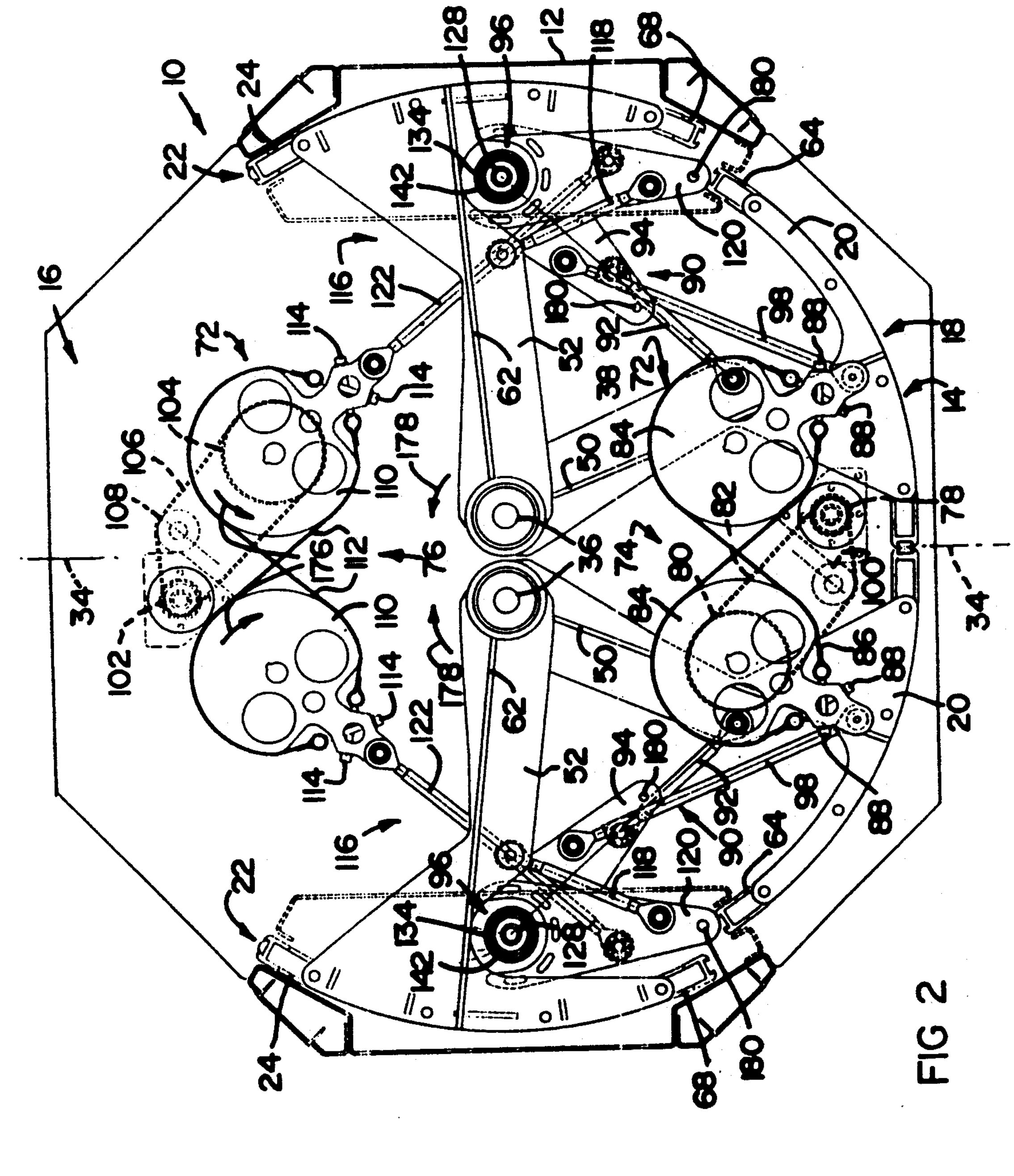
FIG. 2 shows a schematic plan view of a drive means for closure means of the booth.

Referring to the drawings, an access control booth, in accordance with the invention, is illustrated and is designated generally by the reference numeral 10. The access control booth 10 comprises a housing 12 which defines a pair of opposed access openings 14 and 16 (FIG. 2). A closure means 18, comprising a pair of counter-pivoted arcuate members 20, openably closes off the access opening 14. A closure means 22, comprising a pair of counter-pivoted arcuate members 24, openably closes off the access opening 16.

The housing 12 comprises a base member 26 (FIG. 3) a roof member 28 and a side wall portion 30 extending between the base member 26 and the roof member 28. The side wall portion 30 has an inner wall portion 32 which has a substantially circular plan profile so that the access openings 14, 16, defined thereby are substantially arcuate.

As described above, each closure means 18, 22 comprises a pair of counter-pivoted arcuate members 20, 24 respectively. Each arcuate member 20, 24 is pivotally mounted within the housing 12. Those arcuate members 20, 24 on the same side of an imaginary vertical median plane 34, bisecting the access openings 16 and 18, are mounted on a common pivotal axis defined by a shaft 36 mounted within the roof member 28 of the housing 12.

Each arcuate member 20 has a first arm 38 which extends cantilever-fashion from a collar 40 mounted co-axially about the shaft 36 via a pair of bearings 42. Each arcuate member 20 includes a second arm 44 pivotally arranged beneath the base member 26 of the housing 12. Each arm 44 is pivotally mounted on a stud 46 via a double roller bearing 48. The shape of the arm 44 is the same as the shape of the arm 38.

The arm 38 has a strengthening means in the form of a gusset plate 50 attached thereto for imparting rigidity to the arm 38 and strengthening the arm 38. The gusset plate 50 is attached to the collar 40.

Similarly, each arcuate member 24 includes a first arm 52 pivotally mounted on the shaft 36 via a collar 54. The collar 54 is rotatably mounted on the shaft 36 via a pair of bearings 56.

Each arcuate member 24 includes a second arm 58, the same shape as the arm 52, the arm 58 being mounted pivotally beneath the base member 26 of the housing 12 on the stud 46 via a double roller bearing 60.

The first arm 52 of each arcuate member 24 is strengthened by a strengthening means in the form of a gusset plate 62 which is mounted on the arm 52 and the collar 54 from which the arm 52 projects.

The arms 38 and 44 of each arcuate member 20 support an arcuate frame assembly 64 therebetween. The arcuate frame assembly 64 includes an arcuate transparent member 66. Similarly, the arms 52 and 58 of each arcuate member 24 support an arcuate frame assembly 68 therebetween. The arcuate frame assembly 68 carries an arcuate transparent member 70 therein.

The booth 10 includes a drive means 72 for pivotally driving the arcuate members 20, 24. The drive means 72 comprises a first drive arrangement 74 for driving the arcuate members 20 and a second drive arrangement 76 for driving the arcuate members 24. The drive arrangements 74 and 76 are operable independently of each other.

The drive arrangement 74 includes a motor/planetary gearbox combination 78 which drives a toothed pulley 80 via a toothed belt 82. The drive arrangement 74 further includes a synchronizing means in the form of a pair of counter-rotatable pulleys 84 which synchronize pivotal movement of the arcuate members 20. The pulley 80 is mounted on one of the pulleys 84.

The pulleys 84 are interconnected via a pair of belts 86 of a non-stretch material. As illustrated in FIG. 2 of the drawings, the belts 86 are arranged in a figure of eight arrangement. The ends of the belts 86 are mounted via adjustments means 88 on their associated pulleys 84 for adjusting the tension of the belts 86.

Each pulley 84 is connected to its associated arcuate member 20 via a linkage assembly 90. Each linkage assembly 90 comprises a first link arm 92, a first end of which is mounted on the first arm 38 of the arcuate member 20. An opposed end of the link arm 92 is mounted on a link plate 94. The link plate 94 extends from a torsion bar assembly 96, the purpose of which will be described in greater detail below. Each linkage assembly 90 further includes a second link arm 98, a first end of which is connected to its associated pulley 84 and an opposed of which is mounted on the link plate 94.

The tension of the belt 82 is maintained by a belt tensioner 100.

The drive arrangement 76 includes a motor/planetary gearbox combination 102 which drives a toothed pulley 104 via a toothed belt 106. The tension of the belt 106 is maintained via a belt tensioner 108.

The drive arrangement 76 comprises a synchronizing means in the form of a pair of counter-rotating pulleys 110 which are interconnected via a pair of belts of a non-stretch material which are arranged, as illustrated in FIG. 2 of the drawings, in a substantially figure of eight arrangement. The end of each belt 112 is connected to its associated pulley 110 via an adjustment means 114 for adjusting the tension of the belts 112.

Each pulley 110 is connected to its associated arcuate member 24 via a linkage assembly 116. Each linkage assembly 116 comprises a first link arm 118. A first end of the arm 118 is mounted on the arm 52 of the arcuate member 24 and an opposed end of the arm 118 is mounted on a link plate 120. The link plate 120 projects from the torsion bar assembly 96. The linkage assembly 116 includes a second link arm 122 interconnecting the pulley 110 and the link plate 120.

Figure 3:
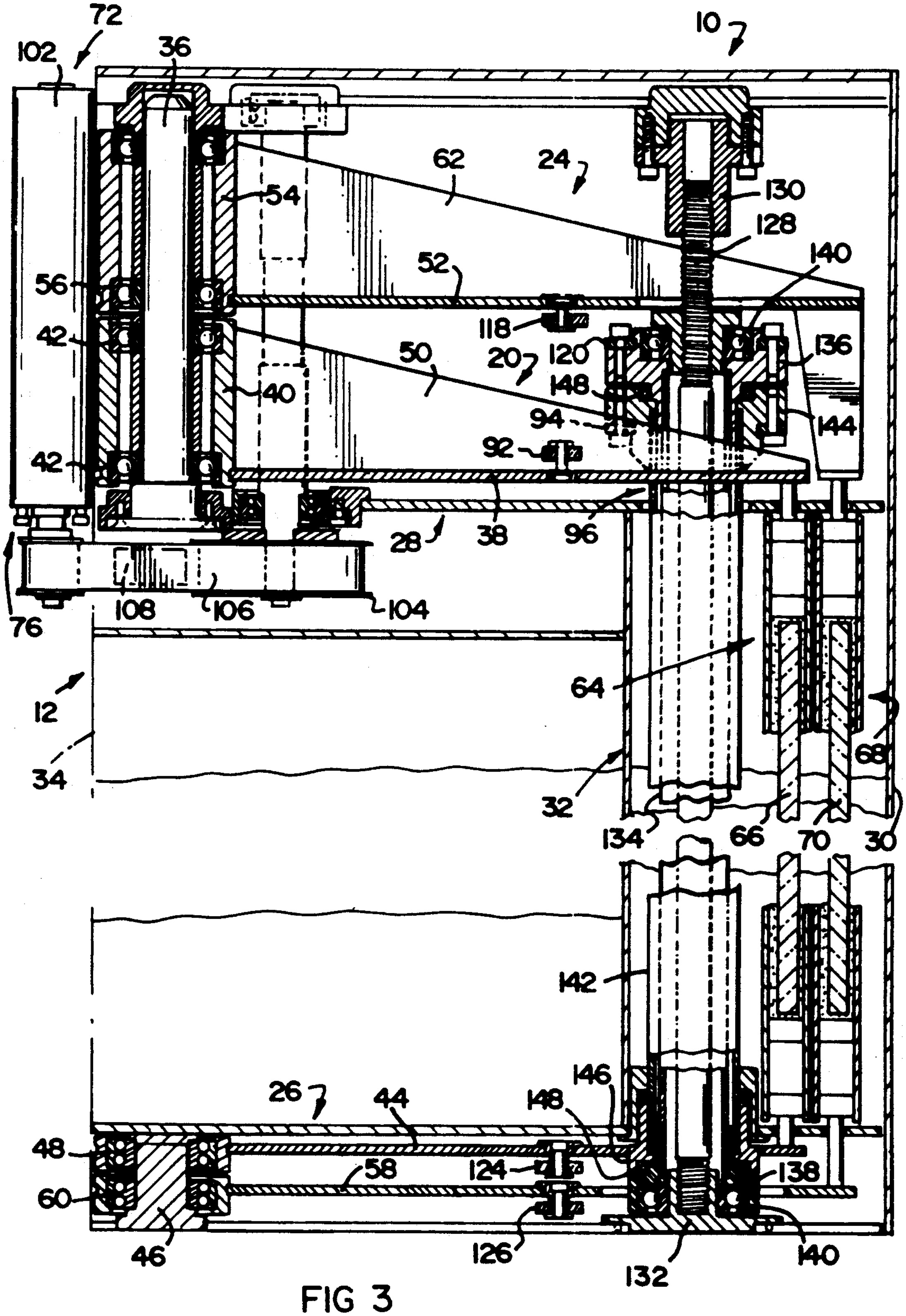
FIG. 3 shows a schematic sectional side view of part of the booth.

The link arms 98 and 122 are both omitted from FIG. 3 of the drawing for the sake of clarity.

In the case of the arcuate members 20, the lower arm 44 of each arcuate member 20 is connected to the torsion bar assembly 96 via a link arm 124 which is the same as the link arm 92. Thus, a first end of the link arm 124 is mounted on the arm 44 and an opposed end of the arm 124 is mounted on a link plate (not shown) attached to the bottom of the torsion bar assembly 96. The lower link plate is similar to the link plate 94 but is narrower than the link plate 94. Effectively, the lower link plate has a width corresponding to the diameter of the torsion bar assembly 96 so that the lower link plate does not interfere with the movement of the arcuate member 20. The lower link plate lies in the same plane as the arm 44.

Similarly, in the case of the arcuate members 24, each arm 58 thereof is connected to the torsion bar assembly via a link arm 126 which corresponds with the link arm 118. Similarly, in the case of this link arm 126, the link arm 126 interconnects the arm 58 and a link plate (also not shown) which corresponds with the link plate 120. Once again, this link plate has a width substantially the same as the diameter of the torsion bar assembly 96 and lies in the same plane as the arm 58 but, due to the fact that the link plate has a diameter substantially the same as the torsion bar assembly 96, it does not interfere with the arcuate movement of the arcuate member 24.

Referring now to the torsion bar assembly 96, the torsion bar assembly 96 interconnects the upper arm 38 and the lower arm 44 of each arcuate member 20. The torsion bar assembly 96 also interconnects the upper arm 52 and the lower arm 58 of each arcuate member 24 to inhibit twisting of the arcuate members 20, 24 as they pivot arcuately.

Thus, as illustrated more clearly in FIG. 3 of the drawings, each torsion bar assembly 96 comprises a first, central rod 128. The rod 128 has screw threaded ends which are received in screw threaded bosses 130 and 132 arranged in the roof member 28 and the base member 26 of the housing 12, respectively.

A central, circular cylindrical tubular shaft 134 is mounted co axially about the rod 128. Each end of the central shaft 134 is splined. A first end of the shaft 134 supports a first collar 136 on which the link plate 120 is mounted. A further collar 138 is mounted on the opposed end of the shaft 134 and this collar supports the lower link plate which is connected to the lower arm 58 of the arcuate member 24 via the link arm 126. The collars 136 and 138 are rotatably fast with the shaft 134 due to the splined ends of the shaft 134. The shaft 134 is rotatably supported relative to the rod 128 via bearings 140.

The torsion bar assembly 96 further comprises an outer, circular cylindrical tubular shaft 142 which is mounted co axially about the shaft 134 and the rod 128 such that the shaft 134 and the rod 128 are nested within the outer shaft 142. The shaft 142 also has splined ends. A first end of the shaft 142 carries a collar 144 thereon which is rotatably fast with the shaft 142. The link plate 94 is mounted on the collar 144.

An opposed end of the shaft 142 carries a further collar 146 which is rotatably fast with the shaft 142. This collar 146 supports the lower link plate to which the lower arm 44 of the arcuate member 20 is connected via the link arm 124.

The shaft 142 is rotatably supported relative to the shaft 134 via bearings 148.

The arrangement of the torsion bar assembly 96 ensures that the booth 10 can be designed in a compact manner while still allowing free arcuate movement of the arcuate members 20, 24.

Figure 1:
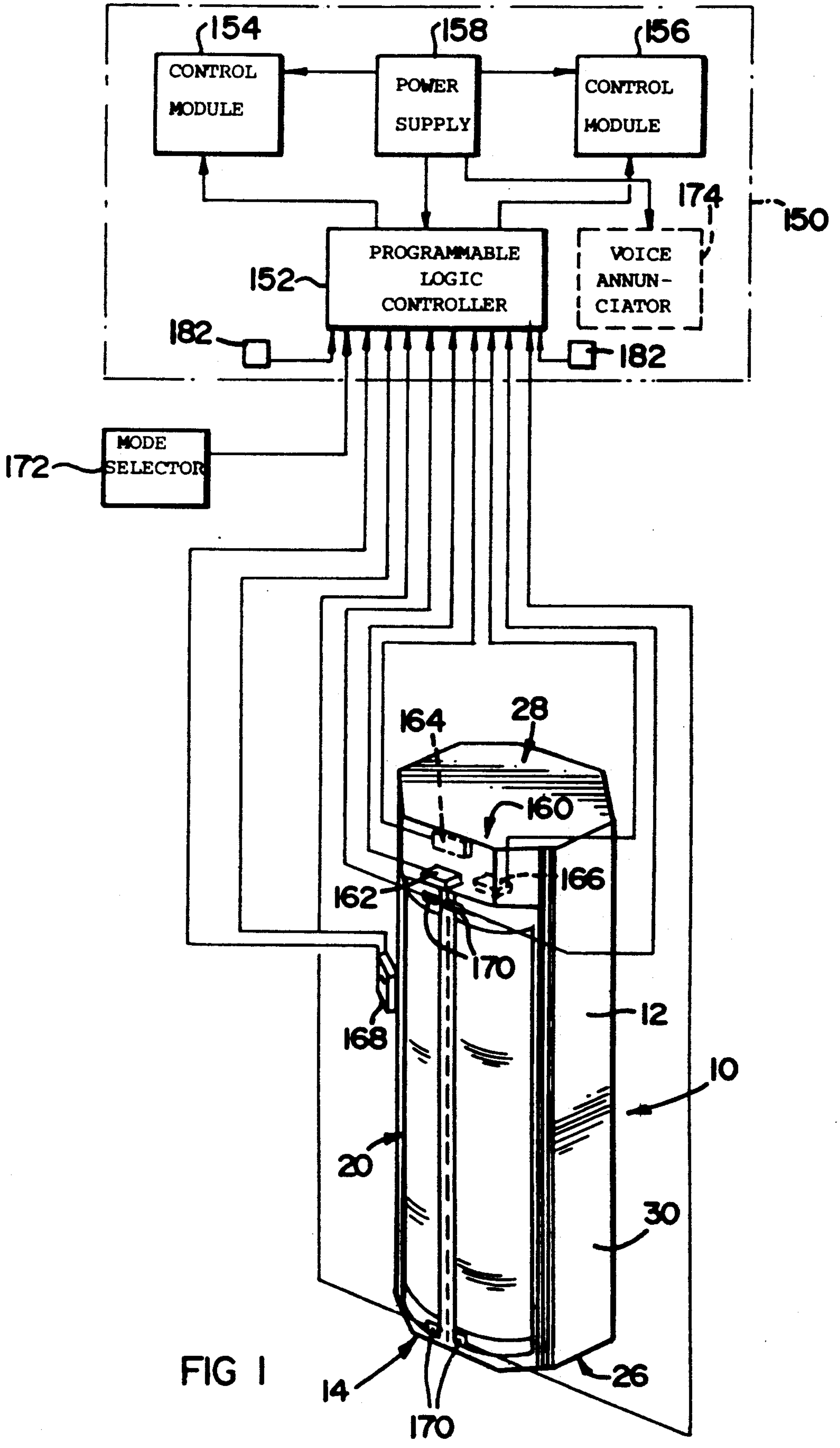
FIG. 1 shows a three dimensional view of an access control booth, in accordance with the invention, including a control means for the booth.

Referring once again to FIG. 1 of the drawings, the booth 10 includes a control means 150 for controlling operation of the motors 78 and 102 which drive the arcuate members 20 and 24, respectively.

The control means 150 includes a programmable logic controller 152 which drives a first control module 154 which controls operation of the motor 78. The programmable logic controller 152 also drives a second control module 156 which controls operation of the motor 102. The control means includes a power supply 158 which supplies power to the programmable logic controller 152 and to the control modules 154 and 156.

The control means 150 further includes a detecting means 160. The detecting means firstly comprises an infra-red approach detector 162, one such detector being mounted above each access opening 14, 16. The approach detector 162 detects the approach of a person to the booth 10. It will be appreciated that each approach detector 162 is mounted outwardly of the roof member 28 of the housing 12 of the booth 10.

A further detecting means in the form of an infra red curtain detector 164 is mounted within the roof member 28 above each access opening 14, 16.

Still further, an infra-red presence detector 166, for monitoring the presence of a person within the booth 10, is mounted within the roof member 28 in communication with the interior of the housing 12.

An access verification means in the form of a card reader 168 is mounted adjacent to each access opening 14, 16.

The control means 150 also includes edge detectors 170 mounted on facing edges of each arcuate member 20 as well as on facing edges of each arcuate member 24 for ensuring that a part of a person or an object is not caught between the arcuate members 20, 24 as they are closing. The edge detectors 170 are retractable within the edges of the arcuate members 20, 24 and are infra-red operable. Should these detectors 170 monitor the presence of an object, they cause opening of the relevant closure means 18, 22, overriding the programmable logic controller 152.

The control means 150 further includes a mode selector 172, the purpose of which will be described below as well as an optional voice annunciator 174.

The power supply 158 of the control means 150 includes a battery back-up module (not shown) for ensuring operation of the booth 10 even in the event of electrical mains supply failure In use, the booth 10 is operable in three different modes as well as an emergency mode where both closure means 18, 22 are opened for allowing evacuation of a building in the event of an emergency.

In a first mode, known as the user-friendly mode, as selected by the mode selector 172, both closure means 18, 22 are open. As a person approaches the booth 10, the approach of the person is detected by the approach detector 162. An appropriate signal is sent to the programmable logic controller 152 which awaits receipt of a valid card read signal from the card reader 168. Should this card read signal not be forthcoming or should an invalid card read signal be received by the programmable logic controller 152 with a simultaneous detection of penetration of the booth 10 by the curtain detector 164, the closure means on the opposite side of the booth 10 to which the person approached the booth 10, closes rapidly, within about 1 to 1.5 seconds, to prevent entry. The voice annunciator, if provided, will announce access denial.

If a valid card read signal is received by the programmable logic controller, both sets of closure means 18, 22 will remain open and the person can proceed through the booth 10 uninterrupted.

In a second mode of operation, known as the precautionary mode of operation, both sets of closure means 18, 22 are closed. Upon the approach of a person being detected by the approach detector 162, the closure means 18, 22 on the side from which the person is approaching opens automatically. The programmable logic controller 152 then awaits receipt of a valid read signal from the card reader 168. Upon receipt of the valid card read signal and verification of the presence of the person within the booth as detected by the presence detector 166, the first closure means 18, 22 closes and the opposed closure means 22, 18 opens to grant passage to the person. If the card reading is invalid the first closure means 18, 22 will remain open with the opposed closure means remaining closed. The access denial if this occurs, can be announced via the voice annunciator 174.

If the presence of the person is no longer detected by the presence detector 166, the programmable logic controller 152 reverts to its state in which both closure means 18, 22 are closed.

In a third mode of operation, referred to as the high security mode, both closure means 18, 22 are closed. Upon receipt of a valid card read signal from the card reader 168, the first closure means 18 or 22 opens. Subsequently, verification of the presence of a person within the booth, as detected by the presence detector 166, causes the first closure means 18 or 22 to close. Following the closure of the first closure means 18 or 22 the second closure means 22 or 18 opens to grant passage. If a card reading is invalid, the first closure means 18 or 22 will remain closed. Once again, access denial can optionally be announced via the voice annunciator 174.

In whatever mode of operation the control means 150 is operating, and with more particular reference to FIG. 2 of the drawings, when the arcuate members 24 close, the counter-rotating pulleys 110 rotate in the direction of arrows 176. As the pulleys 110 rotate, the ends of the link arms 122 move arcuatly about the centres of rotation of the pulleys 110 causing the link plates 120 to pivot about an axis defined by a polar axis of the central rods 128 of the torsion arm assemblies 96. Pivoting of the link plates 120 cause the link arms 118 and 126 to act on the arms 52 and 58, respectively, of the arcuate members 24 to cause the arcuate members 24 to pivot about their pivotal axies as defined by the shaft 36 in the direction of arrows 178 to cause the arcuate members 24 to close off the access opening 16. It will be appreciated that when the arcuate members 24 open, the movement of the various components of the linkage assemblies 116 and the pulleys 110 is reversed.

It is to be noted that when the arcuate members 24 are in their closed position, the link arms 118 adopt an overcentre locking position with respect to their link plate 120 and bear against an abutment means in the form of a raised pin 180. This also applies in respect of the lower link arms 126. This prevents the arcuate member 24 being forced open when they are in their closed position. A similar situation applies in respect of the link arms 92 and 124 of the arcuate members 20.

It will be appreciated by those skilled in the art that due to the movement of the link arms 98 and 122 in opening and closing their associated arcuate members 20 and 24, respectively, a sinusoidal-like motion is imparted to the arcuate members 20, 24. Thus, upon opening, arcuate movement of the arcuate members 20, 24 starts slowly and then speeds up to a maximum speed about mid-way through their arc of movement. Thereafter, the arcuate movement again slows down as the arcuate members 20, 24 reach their fully open position. The movement of the arcuate members 20, 24, as they close, is similar. Nevertheless, to ensure that the facing edges of the arcuate members 20, 24 do not knock into each other with an undue force, door position monitoring means such as an optical sensing arrangement (illustrated schematically at 182 in FIG. 1) is mounted in the housing for monitoring the positions of the arcuate members 20, 24 as they pivot. The optical sensing arrangement 182 is connected to the programmable logic controller 152 so that the programmable logic controller 152 can control the speed of the arcuate members 20, 24.

It is an advantage of the invention that by having the arcuate members 20, 24 pivotally mounted within the housing 12, the arcuate members 20, 24 can be controlled to close and open more rapidly than would otherwise be the case, for example, if they were mounted on rails. Thus, passage of persons through the booth 10 can be controlled more efficiently, thereby allowing more rapid movement of persons through the booth 10. Also, the construction of the booth 10 is such that the arcuate members 20, when open can nest within the arcuate members 24 if they are open, thereby reducing the overall depth of the booth 10. The compact construction of the booth 10 is further facilitated by the arrangement of the torsion bar assemblies 96.

We claim:

1. An access control booth which includes:

a housing having a base member, a roof member and a side wall portion extending between the base member and the roof member, the side wall portion having a substantially circular inner plan profile to define a pair of opposed substantially arcuate access openings;

closure means for operably closing each access opening, each closure means being pivotally mounted within the housing via a pivot point arranged substantially centrally within the housing, each closure means comprising at least one arcuate member having a first arm pivotally mounted within the roof member, a second arm pivotally mounted beneath the base member and an arcuate wall portion extending between the first arm and the second arm; and torsion-inhibiting means connected to the first arm and the second arm of each arcuate member for inhibiting twisting of the arcuate member as it pivots, the torsion-inhibiting means being arranged inwardly of the arcuate wall portion of the arcuate member.

2. The booth as claimed in claim 1 in which each closure means comprises a pair of counter-pivoted arcuate members for opening or closing its associated access opening.

3. The booth as claimed in claim 2 in which each arcuate member comprises a first arm pivotally mounted within the roof member, a second arm pivotally mounted beneath the base member and an arcuate wall portion extending between the first arm and the second arm.

4. The booth claimed in claim 2, in which those arcuate members arranged on the same side of an imaginary vertical median plane bisecting the access openings pivot about a common pivotal axis.

5. The booth as claimed in claim 4 in which the said arcuate members on the same side of the imaginary plane are shaped such that, when both members are in their open position, one member nests within the other member thereby to reduce an overall depth of the housing.

6. The booth as claimed in claim 4 in which arcuate members arranged on the same side of an imaginary plane are connected to the same torsion-inhibiting means.

7. The booth as claimed in claim 2, which includes a drive means for driving the closure means.

8. The booth as claimed in claim 7 in which the drive means comprises a drive arrangement for driving the closure means independently of each other, a drive arrangement being provided for each closure means and the drive arrangements being mounted within the roof member of the housing.

9. The booth as claimed in claim 8 in which each drive arrangement includes a synchronizing means for synchronizing pivotal movement of their associated arcuate members.

10. The booth as claimed in claim 9 in which each synchronizing means includes a pair of counter-rotating pulley elements interconnected by a belt arrangement of a non-stretch material, each pulley element being connected to its associated arcuate member by a linkage assembly.

11. The booth as claimed in claim 10 which each linkage assembly includes an overcentre locking means for positively locking its arcuate member in it closed position.

12. The booth as claimed in claim 7, which includes a control means for controlling operation of the drive means.

13. The booth as claimed in claim 12 in which the control means includes a controller for controlling the operation of the drive means.

14. The booth as claimed in claim 12 in which the control means includes a detecting means for detecting the presence of a person in proximity to the housing, the detecting means being connected to the controller.

15. The booth as claimed in claim 14 in which the detecting means includes a first detector for detecting the approach of a person to the housing and at least one further detector for detecting the presence of a person at either access opening or within the housing.

16. The booth as claimed in claim 15 in which the controller further includes an access verification means arranged at each access opening, the controller being operable to close or open the closure means on receipt of appropriate signals from the access verification means and the detecting means.

* * * * *